United States Patent
Wong Shing et al.

(10) Patent No.: US 6,592,718 B1
(45) Date of Patent: Jul. 15, 2003

(54) METHOD OF IMPROVING RETENTION AND DRAINAGE IN A PAPERMAKING PROCESS USING A DIALLYL-N,N-DISUBSTITUTED AMMONIUM HALIDE-ACRYLAMIDE COPOLYMER AND A STRUCTURALLY MODIFIED CATIONIC POLYMER

(75) Inventors: Jane B. Wong Shing, Aurora, IL (US); Ross T. Gray, Plainfield, IL (US); Andrei S. Zelenev, Oak Park, IL (US); Jiwei Chen, Singapore (SG)

(73) Assignee: Ondeo Nalco Company, Naperville, IL (US)

( * ) Notice: Subject to any disclaimer, the term of this patent is extended or adjusted under 35 U.S.C. 154(b) by 50 days.

(21) Appl. No.: 09/947,675

(22) Filed: Sep. 6, 2001

(51) Int. Cl.⁷ .................. D21H 11/00; D21H 13/00; D21H 15/00; D21H 17/00
(52) U.S. Cl. ................. 162/164.1; 162/158; 162/164.6; 162/168.2; 162/175
(58) Field of Search .................. 162/164.1, 158, 162/164.3, 164.6, 168.1, 168.2, 168.3, 175, 181.1, 183

(56) References Cited

U.S. PATENT DOCUMENTS 5,254,221 A 10/1993 Lowry et al.
6,071,379 A 6/2000 Shing et al.
6,238,521 B1 * 5/2001 Shing et al. ............. 162/164.1

OTHER PUBLICATIONS

Hunter, Henderson, McInnis, Miknevich,, "A New Generation of Copolymers for Retention—Drainage—Formation And Coated Broke Applications," ECC International Inc., pp. 1345–1352.

* cited by examiner

Primary Examiner—Steven P. Griffin
Assistant Examiner—M. Halpern
(74) Attorney, Agent, or Firm—Michael B. Martin; Thomas M. Breininger

(57) ABSTRACT

A method of increasing retention and drainage in a papermaking furnish comprising adding to the furnish an effective amount of a diallyl-N,N-disubstituted ammonium halide/acrylamide copolymer and an effective amount of a cationic structurally-modified water-soluble polymer, the cationic structurally-modified water-soluble polymer prepared by initiating polymerization of an aqueous solution of from about 95 to about 5 mole percent of an acrylamide monomer and from about 5 to about 95 mole percent of a cationic monomer under free radical polymerization conditions to form a polymer solution and adding at least one structural modifier to the polymer solution after at least 30% polymerization of the monomers has occurred.

10 Claims, No Drawings

METHOD OF IMPROVING RETENTION AND DRAINAGE IN A PAPERMAKING PROCESS USING A DIALLYL-N,N-DISUBSTITUTED AMMONIUM HALIDE-ACRYLAMIDE COPOLYMER AND A STRUCTURALLY MODIFIED CATIONIC POLYMER

TECHNICAL FIELD

This invention concerns a method of improving retention and drainage in papermaking processes using a diallyl-N,N-disubstituted ammonium halide/acrylamide copolymer in combination with a cationic, structurally-modified polymer.

BACKGROUND OF THE INVENTION

International Patent Application No. US01/10867, published Jan. 10, 2002, describes the preparation of structurally-modified cationic polymers and their use as retention and drainage aids in papermaking processes.

The use of medium molecular weight diallyldimethylammonium chloride/acrylamide copolymers as retention and drainage aids is reviewed in Hunter et al., "*TAPPI 99 Preparing for the Next Millennium*", vol. 3, pp. 1345–1352, TAPPI Press (1999).

U.S. Pat. No. 6,071,379 discloses the use of diallyl-N,N-disubstituted ammonium halide/acrylamide dispersion polymers as retention and drainage aids in papermaking processes.

U.S. Pat. No. 5,254,221 discloses a method of increasing retention and drainage in a papermaking process using a low to medium molecular weight diallyldimethylammonium chloride/acrylamide copolymer in combination with a high molecular weight dialkylaminoalkyl (meth)acrylate quaternary ammonium salt/acrylamide copolymer.

Nonetheless, there is a continuing need for new compositions and processes to further improve retention and drainage performance, particularly for use on the faster and bigger modern papermaking machines currently being put into use.

We have discovered that using a diallyl-N,N-disubstituted ammonium halide/acrylamide copolymer in combination with a cationic, structurally-modified polymer outperforms the dual cationic coagulant/flocculant systems such as EPI:DMA/cationic polymer that are typically used for improving retention and drainage in papermaking processes. Moreover, there is an unexpected synergistic effect with the diallyl-N,N-disubstituted ammonium halide/acrylamide copolymer—cationic, structurally-modified polymer combination of this invention that is not seen when a typical unmodified cationic flocculant of similar charge is used.

Accordingly, this invention is directed to a method of increasing retention and drainage in a papermaking furnish comprising adding to the furnish an effective amount of a diallyl-N,N-disubstituted ammonium halide/acrylamide copolymer and an effective amount of a cationic structurally-modified water soluble polymer, wherein the cationic structurally-modified water-soluble polymer is prepared by initiating polymerization of an aqueous solution of from about 95 to about 5 mole percent of an acrylamide monomer of formula

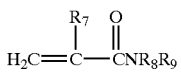

wherein $R_7$, $R_8$ and $R_9$ are independently selected from H and alkyl and from about 5 to about 95 mole percent of a cationic monomer of formula

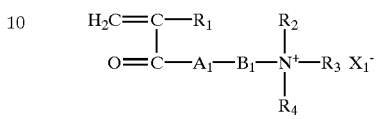

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alkyl; $R_3$ is H, $C_1$–$C_2$ alkyl or arylalkyl; and $X_1$ is an anionic counterion under free radical polymerization conditions to form a polymer solution and adding at least one structural modifier to the polymer solution after at least 30% polymerization of the monomers has occurred.

DETAILED DESCRIPTION OF THE INVENTION

Definitions of Terms

As used herein, the following abbreviations and terms shall have the following meanings.

"AcAm" for acrylamide.

"DADMAC" for diallyldimethylammonium chloride.

"DMAEA.MCQ" for dimethylaminoethyl acrylate, methyl chloride quaternary salt.

"EDTA.4Na$^+$" for ethylenediaminetetraacetic acid, tetrasodium salt.

"Alfonic® 1412-60" for ethoxylated linear alcohol (60% ethylene oxide) available from Vista Chemical Co., Houston, Tex.

"Span 80" for sorbitan monooleate available from ICI Specialty Chemicals, Wilmington, Del.

"Triton® N-101" for nonylphenoxy polyethoxy ethanol, available from Rohm and Haas Co., Philadelphia, Pa.

"Tween 61" for POE (4) sorbitan monostearate, available from ICI Specialty Chemicals, Wilmington, Del.

"AIBN" for 2,2'-azobis(isobutyronitrile), available from E.I. du Pont de Nemours & Co. Inc.; Wilmington, Del.

"AIVN" for 2,2'-azobis(2,4-dimethylvaleronitrile), available from E.I. du Pont de Nemours & Co. Inc.; Wilmington, Del.

"POE" for polyoxyethylene.

"RSV" stands for reduced specific viscosity. Within a series of polymer homologs which are substantially linear and well solvated, "reduced specific viscosity (RSV)" measurements for dilute polymer solutions are an indication of polymer chain length and average molecular weight according to Paul J. Flory, in "*Principles of Polymer Chemistry*", Cornell University Press, Ithaca, N.Y., ©1953, Chapter VII, "*Determination of Molecular Weights*", pp. 266–316. The RSV is measured at a given polymer concentration and temperature and calculated as follows:

$$RSV = \frac{[(\eta/\eta_0) - 1]}{c}$$

$\eta$=viscosity of polymer solution
$\eta_o$=viscosity of solvent at the same temperature
c=concentration of polymer in solution.

The units of concentration "c" are (grams/100 ml or g/deciliter). Therefore, the units of RSV are dl/g. In this patent application, a 1.0 molar sodium nitrate solution is used for measuring RSV, unless specified. The polymer concentration in this solvent is 0.045 g/dl. The RSV is measured at 30° C. The viscosities $\eta$ and $\eta_o$ are measured using a Cannon Ubbelohde semimicro dilution viscometer, size 75. The viscometer is mounted in a perfectly vertical position in a constant temperature bath adjusted to 30±0.02° C. The error inherent in the calculation of RSV is about 2 dl/g. When two polymer homologs within a series have similar RSV's that is an indication that they have similar molecular weights.

"IV" stands for intrinsic viscosity, which is RSV extrapolated to the limit of infinite dilution, infinite dilution being when the concentration of polymer is equal to zero.

"Based on formula" means the amount of reagent added based on the total formula weight.

"Based on polymer active" and "based on monomer" mean the amount of a reagent added based on the level of vinylic monomer in the formula, or the level of polymer formed after polymerization, assuming 100% conversion.

"Papermaking process" means a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. Conventional microparticles, alum, cationic starch or a combination thereof may be utilized as adjuncts with the dual polymer treatment of this invention, though it must be emphasized that no adjunct is required for effective retention and drainage activity.

"Structurally modified cationic polymer" means a high molecular weight water-soluble polymer prepared by initiating polymerization of a solution of (meth)acrylamide and one or more cationic monomers under free radical polymerization conditions to form a polymer solution and adding at least one structural modifier to the polymer solution after at least 30% polymerization of the monomers has occurred. The structurally modified cationic polymer may be an emulsion polymer, dispersion polymer, solution polymer or gel polymer. The structurally modified cationic polymer preferably has a RSV of from about 12 to about 40, more preferably from about 15 to about 35 and still more preferably from about 20 to about 30 dl/g and preferably comprises from about 5 to about 30, more preferably from about 7 to about 25 and still more preferably from about 9 to about 18 mole percent cationic monomer. A preferred structurally modified cationic polymer is dimethylaminoethylacrylate methyl chloride quaternary salt/acrylamide copolymer.

"Acrylamide monomer" means a monomer of formula

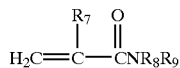

wherein $R_7$, $R_8$ and $R_9$ are independently selected from H and alkyl. Preferred acrylamide monomers are acrylamide and methacrylamide. Acrylamide is more preferred.

"Cationic monomer" means a monomer of formula

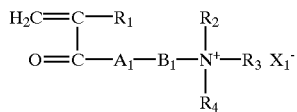

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alkyl; $R_3$ is H, $C_1$–$C_2$ alkyl or arylalkyl; and $X_1$ is an anionic counterion. Representative cationic monomers include dimethylaminoethylmethacrylate benzyl chloride salt (DMAEM.BCQ), dimethylaminoethylacrylate benzyl chloride salt (DMAEA.BCQ), dimethylaminoethylacrylate methyl chloride salt (DMAEA.MCQ), diethylaminoethylacrylate methyl chloride salt (DEAEA.MCQ), dimethylaminoethylmethacrylate methyl chloride salt (DMAEM.MCQ), dimethylaminoethylmethacrylate methyl sulfate salt (DMAEM.MSQ), dimethylaminoethylacrylate methyl sulfate salt (DMAEA.MSQ), methacrylamidopropyltrimethylammonium chloride (MAPTAC), acrylamidopropyltrimethylammonium chloride (APTAC), and the like. Dimethylaminoethylacrylate methyl chloride salt and dimethylaminoethylmethacrylate benzyl chloride salt are preferred.

"Diallyl-N,N-disubstituted ammonium halide/acrylamide copolymer means a copolymer of a diallyl-N,N-disubstituted ammonium halide monomer of formula

wherein $R_5$ and $R_6$ are independently $C_1$–$C_{20}$ alkyl, aryl or arylalkyl and X is a halogen and an acrylamide monomer as defined herein. The diallyl-N,N-disubstituted ammonium halide/copolymer may be an emulsion polymer, dispersion polymer, solution polymer or gel polymer. The diallyl-N,N-disubstituted ammonium halide/acrylamide copolymer preferably has a RSV of from about 1 to about 10, more preferably from about 2 to about 8 and still more preferably from about 3 to about 6 dl/g and preferably comprises from about 10 to about 70, more preferably from about 18 to about 63 and still more preferably from about 25 to about 55 mole percent diallyl-N,N-disubstituted ammonium halide monomer. A preferred diallyl-N,N-disubstituted ammonium halide/acrylamide copolymer is diallyldimethylammonium chloride/acrylamide copolymer.

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkylene" means a divalent group derived from a straight or branched chain saturated hydrocarbon by the removal of two hydrogen atoms. Representative alkylene groups include methylene, ethylene, propylene, and the like.

"Aryl" means an aromatic monocyclic or multicyclic ring system of about 6 to about 20 carbon atoms, preferably of about 6 to about 10 carbon atoms. The aryl is optionally substituted with one or more alkyl, alkoxy, halogen or haloalkyl groups. Representative aryl groups include phenyl or naphthyl, or substituted phenyl or substituted naphthyl. A preferred substituent is alkyl.

"Arylalkyl" means an aryl-alkylene- group wherein aryl and alkylene are defined herein. Representative arylalkyl groups include benzyl, phenylethyl, phenylpropyl, 1-naphthylmethyl, and the like. A preferred arylalkyl is benzyl.

"Alkoxy" and "alkoxyl" mean an alkyl-O— group wherein alkyl is defined herein. Representative alkoxy groups include methoxyl, ethoxyl, propoxyl, butoxyl, and the like.

"Halogen" means fluorine, chlorine, bromine or iodine.

"Haloalkyl" means an alkyl group, as defined herein, having one, two, or three halogen atoms attached thereto. Representative haloalkyl groups include chloromethyl, bromoethyl, trifluoromethyl, and the like.

"Hydroxypropylene" means a propylene group substituted with hydroxy.

"(Meth)acrylamide" means acrylamide or methacrylamide.

"Structural modifier" means an agent that is added to the aqueous polymer solution to control the polymer structure and solubility characteristics. The structural modifier is selected from the group consisting of cross-linking agents and chain transfer agents.

"Chain transfer agent" means any molecule, used in free-radical polymerization, which will react with a polymer radical forming a dead polymer and a new radical. In particular, adding a chain transfer agent to a polymerizing mixture results in a chain-breaking and a concomitant decrease in the size of the polymerizing chain. Thus, adding a chain transfer agent limits the molecular weight of the polymer being prepared. Representative chain transfer agents include alcohols such as methanol, ethanol, 1-propanol, 2-propanol, butyl alcohol, and glycerol, and the like, sulfur compounds such as alkylthiols, thioureas, sulfites, and disulfides, carboxylic acids such as formic and malic acid, and their salts and phosphites such as sodium hypophosphite, and combinations thereof. See Berger et al., "*Transfer Constants to Monomer, Polymer, Catalyst, Solvent, and Additive in Free Radical Polymerization,*" Section II, pp. 81–151, in "*Polymer Handbook*" edited by J. Brandrup and E. H. Immergut, 3d edition, John Wiley & Sons, New York (1989) and George Odian, *Principles of Polymerization,* second edition, John Wiley & Sons, New York (1981). A preferred alcohol is 2-propanol. Preferred sulfur compounds include ethanethiol, thiourea, and sodium bisulfite. Preferred carboxylic acids include formic acid and its salts. More preferred chain-transfer agents are sodium hypophosphite and sodium formate.

"Cross-linking agent" or "branching agent" means a multifunctional monomer that when added to polymerizing monomer or monomers results in "cross-linked" polymers in which a branch or branches from one polymer molecule become attached to other polymer molecules. Preferred cross-linkers are polyethylenically unsaturated monomers. Representative preferred cross-linking agents include N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, triethylene glycol dimethylacrylate, polyethylene glycol dimethacrylate, N-vinylacrylamide, N-methylallylacrylamide, glycidyl acrylate, acrolein, glyoxal and vinyltrialkoxysilanes such as vinyltrimethoxysilane (VTMS), vinyltriethoxysilane, vinyltris(β-methoxyethoxy)silane, vinyltriacetoxysilane, allyltrimethoxysilane, allyltriacetoxysilane, vinylmethyldimethoxysilane, vinyldimethoxyethoxysilane, vinylmethyldiacetoxysilane, vinyldimethylacetoxysilane, vinylisobutyldimethoxysilane, vinyltriisopropoxysilane, vinyltri-n-butoxysilane, vinyltrisecbutoxysilane, vinyltrihexyloxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyoxysilane, and vinyldimethoxyoleyloxysilane. A more preferred vinylalkoxysilane monomer is vinyltrimethoxysilane.

"Emulsion polymer" and "latex polymer" mean a water-in-oil polymer emulsion comprising a cationic, anionic or nonionic polymer according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873, incorporated herein by reference. Representative preparations of high molecular weight inverse emulsion polymers are described in U.S. Pat. Nos. 2,982,749; 3,284,393; and 3,734,873. See also, Hunkeler, et al., "*Mechanism, Kinetics and Modeling of the Inverse-Microsuspension Homopolymerization of Acrylamide,*" Polymer, vol. 30(1), pp 127–42 (1989); and Hunkeler et al., "*Mechanism, Kinetics and Modeling of Inverse-Microsuspension Polymerization: 2. Copolymerization of Acrylamide with Quaternary Ammonium Cationic Monomers,*" Polymer, vol. 32(14), pp 2626–40 (1991).

The aqueous phase is prepared by mixing together in water one or more water-soluble monomers, and any polymerization additives such as inorganic salts, chelants, pH buffers, and the like.

The oil phase is prepared by mixing together an inert hydrocarbon liquid with one or more oil soluble surfactants. The surfactant mixture should have a low hydrophilic-lypophilic balance (HLB), to ensure the formation of an oil continuous emulsion. Appropriate surfactants for water-in-oil emulsion polymerizations, which are commercially available, are compiled in the North American Edition of McCutcheon's *Emulsifiers & Detergents.* The oil phase may need to be heated to ensure the formation of a homogeneous oil solution.

The oil phase is then charged into a reactor equipped with a mixer, a thermocouple, a nitrogen purge tube, and a condenser. The aqueous phase is added to the reactor containing the oil phase with vigorous stirring to form an emulsion. The resulting emulsion is heated to the desired temperature, purged with nitrogen, and a free-radical initiator is added. The reaction mixture is stirred for several hours under a nitrogen atmosphere at the desired temperature. Upon completion of the reaction, the water-in-oil emulsion polymer is cooled to room temperature, where any desired post-polymerization additives, such as antioxidants, or a high HLB surfactant (as described in U.S. Pat. No. 3,734,873) may be added.

The resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873).

"Dispersion polymer" means a dispersion of fine particles of polymer in an aqueous salt solution which is prepared by polymerizing monomers with stirring in an aqueous salt solution in which the resulting polymer is insoluble. See U.S. Pat. Nos. 5,708,071; 4,929,655; 5,006,590; 5,597,859; 5,597,858 and European Patent nos. 657,478 and 630,909.

In a typical procedure for preparing a dispersion polymer, an aqueous solution containing one or more inorganic or hydrophobic salts, one or more water-soluble monomers, any polymerization additives such as processing aids, chelants, pH buffers and a water-soluble stabilizer polymer is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. After this time, the mixture is cooled to room temperature, and any post-polymerization additives are charged to the reactor. Water continuous dispersions of water-soluble polymers are free flowing liquids with product viscosities generally 100–10,000 cP, measured at low shear.

In a typical procedure for preparing gel polymers, an aqueous solution containing one or more water-soluble monomers and any additional polymerization additives such as chelants, pH buffers, and the like, is prepared. This mixture is charged to a reactor equipped with a mixer, a thermocouple, a nitrogen purging tube and a water condenser. The solution is mixed vigorously, heated to the desired temperature, and then one or more water-soluble free radical polymerization initiators are added. The solution is purged with nitrogen while maintaining temperature and mixing for several hours. Typically, the viscosity of the solution increases during this period. After the polymerization is complete, the reactor contents are cooled to room temperature and then transferred to storage. Gel polymer viscosities vary widely, and are dependent upon the concentration and molecular weight of the active polymer component.

The polymerization reactions described herein are initiated by any means which results in generation of a suitable free-radical. Thermally derived radicals, in which the radical species results from thermal, homolytic dissociation of an azo, peroxide, hydroperoxide and perester compound are preferred. Especially preferred initiators are azo compounds including 2,2'-azobis(2-amidinopropane)dihydrochloride, 2,2'-azobis[2-(2-imidazolin-2-yl)propane]dihydrochloride, 2,2'-azobis(isobutyronitrile) (AIBN), 2,2'-azobis(2,4-dimethylvaleronitrile) (AIVN), and the like.

The polymerization conditions utilized herein are selected such that the resulting water-soluble structurally-modified polymer has a molecular weight of 2 million to 30 million and an intrinsic viscosity above 1, more preferably above 6 and still more preferably 15 to 30 dl/g. The reduced specific viscosity of the water-soluble structurally-modified polymer is generally above 3, preferably above 12 and frequently above 24 dl/g.

The structural modifiers are added to the reaction mixture after the start of polymerization of the monomers and prior to completion of polymerization of the monomers. They may be added all at once as a single treatment, or in portions. The level of modifier added to the aqueous polymer solution depends on the efficiency of the structural modifier, the polymer concentration, and the degree of polymerization at which it is added.

The degree of polymerization of monomers is determined by the change in the reaction density for water-in-oil emulsion polymerization, calorimeterically by measuring the heat of reaction, by quantitative infrared spectroscopy, or chromatographically, by measuring the level of unreacted monomer.

When a chain-transfer agent is the structural modifying agent, the chain-transfer agent may be added all at once as a single treatment, in portions, or in a manner such that the rate of addition parallels polymer conversion. In one embodiment, addition may be as a single treatment added after about 30%, preferably after about 50% polymerization of the monomers. The level of chain-transfer agent added is generally between from about 1 to about 30,000 ppm, preferably from about 25 to about 10,000 ppm and more preferably from about 50 to about 2,000 ppm based on monomer. When the chain-transfer agent is sodium hypophosphite, the level added is generally from about 2 to about 2000 ppm, preferably from about 100 to about 1000 ppm.

When the structural modifier is a cross-linking agent, the cross-linking agent is added after about 30%, preferably after about 50% polymerization of the monomers. The level of cross-linking agent is generally from about 0.1 to about 500 ppm, preferably from about 1 to about 50 ppm based on monomer. When the cross-linking agent is methylenebisacrylamide, the level is generally from about 0.5 to about 50 ppm, preferably from about 1 to about 10 ppm based on monomer.

When the cross-linker is a vinyltrialkoxysilane, the level of cross-linker is generally from about 0.1 to about 30,000 ppm, preferably from about 0.5 to about 15,000 ppm, more preferably from about 1 to about 3,000 ppm based on monomer. The vinyltrialkoxysilane may be added all at once as a single treatment, or in portions after the polymerization of the monomers has started, preferably after about 30 percent of the monomers have polymerized.

When the structural modifier is a combination of a cross-linker and a chain transfer agent, the amounts of each may vary widely based on the chain-transfer constant "efficiency" of the chain-transfer agent, the multiplicity and "efficiency" of the cross-linking agent, and the point during the polymerization where it is added. For example from about 1,000 to about 5,000 ppm (based on monomer) of a moderate chain transfer agent such as isopropyl alcohol may be suitable while much lower amounts, typically from about 100 to about 500 ppm, of more effective chain transfer agents such as mercaptoethanol are useful. Representative combinations of cross-linkers and chain transfer agents contain from about 1 to about 30,000 ppm, preferably from about 25 to about 10,000 and more preferably from about 300 to about 1500 ppm (based on monomer) of chain transfer agent and from about 1 to about 500, preferably from about 2 to about 100 and more preferably from about 5 to about 50 ppm (based on monomer) of cross-linker. A preferred combination of cross-linker and chain transfer agent is methylenebisacrylamide and formic acid and its salts, preferably sodium formate.

Preferred Embodiments

In a preferred aspect of this invention, the structural modifier is selected from the group consisting of cross-linking agents, chain transfer agents and mixtures thereof.

In another preferred aspect, the cationic monomer is dimethylaminoethyl acrylate methyl chloride quaternary salt and the acrylamide monomer is acrylamide.

In another preferred aspect, the structural modifier is selected from the group consisting of sodium formate, sodium hypophosphite, vinyltrimethoxysilane, methylenebisacrylamide, and combinations thereof.

In another preferred aspect, the structurally modified polymer is dimethylaminoethyl acrylate methyl chloride quaternary salt/acrylamide copolymer.

In another preferred aspect, the dimethylaminoethyl acrylate methyl chloride quaternary salt/acrylamide copolymer is composed of from about 5 to about 30 mole percent dimethylaminoethyl acrylate methyl chloride quaternary salt and from about 95 to about 70 mole percent acrylamide.

In another preferred aspect, the diallyl-N,N-disubstituted ammonium halide/acrylamide copolymer is diallyldimethylammonium chloride/acrylamide.

In another preferred aspect, the diallyldimethylammonium chloride/acrylamide copolymer is composed of from about 25 to about 55 mole percent diallyldimethylammonium chloride and from about 75 to about 45 mole percent acrylamide.

In another preferred aspect, the diallyl-N,N-disubstituted ammonium halide/acrylamide copolymer has a RSV of from about 1 to about 10 dl/g and the cationic structurally-modified water soluble polymer has a RSV of from about 12 to about 40 dl/g.

The effective amount of the structurally-modified water-soluble polymer and the diallyl-N,N-disubstituted ammonium halide/acrylamide copolymer depends on the characteristics of the particular papermaking furnish and can be readily determined by one of ordinary skill in the papermaking art. Typical dosages of the diallyl-N,N-disubstituted ammonium halide/acrylamide copolymer are from about 0.01 to about 10, preferably from about 0.05 to about 5 and more preferably from about 0.1 to about 1 kg polymer actives/ton solids in the furnish.

Typical dosages of the structurally-modified water-soluble polymer are from about 0.005 to about 10, preferably from about 0.01 to about 5 and more preferably from about 0.05 to about 1 kg polymer actives/ton solids in the furnish.

The order and method of addition of the cationic structurally modified polymer and diallyl-N,N-disubstituted ammonium halide/acrylamide copolymer are not critical and can be readily determined by one of ordinary skill in the papermaking art. However, the following are preferred.

The cationic structurally modified polymer and diallyl-N,N-disubstituted ammonium halide/acrylamide copolymer are dosed separately to the thin stock with the diallyl-N,N-disubstituted ammonium halide/acrylamide copolymer added first followed by addition of the polymer.

In another preferred method of addition, the diallyl-N,N-disubstituted ammonium halide/acrylamide copolymer is added to tray water, e.g. the suction side of the fan pump prior to thick stock addition, and the polymer to the thin stock line.

In another preferred method of addition, the diallyl-N,N-disubstituted ammonium halide/acrylamide copolymer is added to thick stock, e.g. stuff box, machine chest or blend chest, followed by addition of the structurally modified polymer in the thin stock line.

In another preferred method of addition, the diallyl-N,N-disubstituted ammonium halide/acrylamide copolymer and the structurally modified polymer are fed simultaneously to the thin stock like a single polymer program.

The retention and drainage properties of the furnish may also be improved by addition of a microparticle. For Example, U.S. Pat. Nos. 4,753,710, 4,913,775, 5,393,381 and 6,007,679 incorporated herein by reference, describe the use of cationic polymers and microparticles in a papermaking process.

"Microparticles" means highly charged materials that improve flocculation when used together with natural and synthetic macromolecules. Microparticles are used in combination with other wet end additives to improve retention and drainage on the paper machine. Microparticles encompass a broad set of chemistries including polysilicate microgel, structured colloidal silicas, colloidal alumina, polymers including copolymers of acrylic acid and acrylamide and naphthalene sulfonate/formaldehyde condensate polymers, bentonite and mineral clays such as montmorillonite, saponite and smectite types and colloidal silica in its many forms including modified colloidal silicic acids such as those described in PCT/US98/19339.

Representative copolymers of acrylic acid and acrylamide useful as microparticles include Nalco® 8677 PLUS, available from ONDEO Nalco Company, Naperville, Ill, USA. Other copolymers of acrylic acid and acrylamide are described in U.S. Pat. No. 5,098,520, incorporated herein by reference.

"Bentonites" include any of the materials commercially referred to as bentonites or as bentonite-type clays, i.e., anionic swelling clays such as sepialite, attapulgite and montmorillonite. In addition, the bentonites described in U.S. Pat. No. 4,305,781 are suitable. A preferred bentonite is a hydrated suspension of powdered bentonite in water. Powdered bentonite is available as Nalbrite™, from ONDEO Nalco Company.

Representative dispersed silicas have an average particle size of from about 1 to about 100 nanometers (nm), preferably from about 2 to about 25 nm, and more preferably from about 2 to about 15 nm. This dispersed silica may be in the form of colloidal silicic acid, silica sols, fumed silica, agglomerated silicic acid, silica gels, precipitated silicas, and all materials described in Patent Cooperation Treaty Patent Application No. PCT/US98/19339, so long as the particle size or ultimate particle size is within the above ranges. Dispersed colloidal silica in water with a typical particle size of 4 nm is available as Nalco® 8671, from ONDEO Nalco Company. Another type of inorganic colloid used as a microparticle is a borosilicate in water; available as Nalco® 8692, from ONDEO Nalco Company. Other types of colloidal silica and modified colloidal silicas are commercially available from E.I. du Pont de Nemours and Co., Wilmington, Del. under the tradename Ludox®, from Akzo Nobel, Surte, Sweden (BMA or NP Series), from Vinings Industries Inc., Atlanta, Ga. and from Nissan Chemical Industries, Ltd., Tokyo, Japan.

Representative naphthalene sulfonate/formaldehyde condensate polymers include Nalco® 8678 from ONDEO Nalco Company.

The amount of microparticle added to the papermaking furnish is from about 0.025 to about 5, preferably from about 0.05 to about 4 and more preferably about 0.1 to about 3 kilograms microparticle/tonne.

"Kilograms microparticle/tonne" means kilograms of actual microparticle per 1000 kilograms of solids present in the furnish. The abbreviation for kilograms of actual microparticle per 1000 kilograms of solids present in the furnish is "kg microparticle/tonne".

The microparticle is added to the papermaking furnish either before or after the structurally-modified polymer is added to the furnish. The choice of whether to add the microparticle before or after the polymer can be made by a person of ordinary skill in the art based on the requirements and specifications of the papermaking furnish.

The foregoing may be better understood by reference to the following examples that are presented for purposes of illustration and are not intended to limit the scope of the invention.

EXAMPLE 1

A VTMS modified 15% solids, 90/10 mole percent AcAm/DMAEA.MCQ copolymer is synthesized using the following procedure.

To a 1500 ml resin flask equipped with a stirrer, temperature controller, nitrogen sparge tube and water condenser is added 335.2 g of deionized water, 230.3 g of a 48.6% aqueous solution of acrylamide (ONDEO Nalco Co., Naperville, Ill.), 43.6 g of dimethlyaminoethylacrylate methyl chloride quaternary salt (DMAEA.MCQ, 80%, NCF Manufacturing, Riceboro, Ga.), 50.0 g of a 15% solution of poly(dimethylaminoethylmethacrylate methyl chloride quaternary salt) (ONDEO Nalco Co., Naperville, Ill.), 5.0 g of adipic acid, 13.5 g of glycerol, 0.42 g of EDTA.4Na$^+$ and 302.0 g ammonium sulfate. The mixture is heated to 48° C. and 1.0 g of a 1% solution of V-50 is added. The resulting solution is sparged with nitrogen at the rate of 1000 ml/min. After 15 minutes, polymerization begins and the solution becomes viscous. Over the next four hours, the temperature is maintained at 48° C. After 3.0 hours of polymerization, an additional 2.0 g of a 1% solution of V-50 is added to the reaction mixture. After 3.5 hours of polymerization, 0.25 g of vinyltrimethoxysilane (VTMS) is added to the reaction mixture. At four hours after initiation, 4.0 g of a 10% solution of V-50 is added to the dispersion and the reaction is allowed to continue for another 4 hours. After this time, the dispersion is cooled to room temperature, and 5.0 g of adipic acid and 10.0 g of sodium thiosulfate is added. The polymer product has a Brookfield viscosity of 150 cP (#3 spindle, 12 rpm) and a reduced specific viscosity of 18 dl/g at 450 ppm in 1 N $NaNO_3$.

EXAMPLE 2

A 90/10 mole percent AcAm/DMAEA.MCQ copolymer modified with MBA and sodium formate is synthesized as follows.

An aqueous monomer phase is made-up by stirring together 364.37 g of a 49.6% aqueous solution of acrylamide (ONDEO Nalco Co., Naperville, Ill.), 175.20 g of water, 9.00 g of adipic acid, 27.00 g of NaCl, and 0.80 g of a 50% aqueous solution of NaOH until the components are in solution. To the resulting solution is added 67.90 g of a 80.3% solution of dimethylaminoethylacrylate methyl chloride quaternary salt (DMAEA.MCQ, CPS Chemical Co.; Old Bridge, N.J.) and 0.09 g of EDTA.4Na$^+$ (Van Waters & Rogers, Geismar, La.). The pH of the resulting mixture is 3.8.

An oil phase is prepared by heating a mixture of 234.29 g of paraffinic oil (Isopar M, Exxon, Houston, Tex.), 13.5 g of Span-80 and 4.5 g of Tween-61 until the surfactants dissolve (54–57° C.). The oil phase is charged into a 2 L reactor. With vigorous stirring (900 rpm, 10 mm rod with a teflon paddle at the base and 6-blade turbine mounted 3-inches from the bottom), the monomer phase is added over 2 minutes. The resulting mixture is stirred for 30 minutes and heated to 45° C.

To the water-in-oil emulsion is added 0.200 g of AIBN and 0.027 g of AIVN. The polymerization is carried out under a $N_2$ atmosphere at 45° C. for 4 hours, then 70° C. for one hour. A solution of 0.0059 g methylene bisacrylamide (25 ppm, Aldrich Chemical Company, Milwaukee, Wis.) and 0.1882 g sodium formate (800 ppm, Van Waters & Rogers, Geismar, La.) in 5.87 g water is added to the reaction mixture at a constant rate from 54–80% monomer conversion. The resulting polymer has a RSV of 22.7 dl/g (1M $NaNO_3$, 450 ppm, 30° C.).

Representative polymers used in Examples 3–11 are listed in Table 1.

In Table 1, Polymers A, H and I are unmodified flocculants used for comparison purposes. Polymers B–G are representative structurally modified polymers prepared according to the method of Examples 1 or 2. Polymers J–N are representative DADMAC/AcAm copolymers and Polymers O, P and Q are conventional cationic coagulants. Polymers A–Q are available from ONDEO Nalco Company, Naperville, Ill.

TABLE 1

Representative Polymers

| Polymer | Cationic Charge (mol %) | Form | Avg. RSV (dl/g) | Structural Modifier | Chemistry |
|---|---|---|---|---|---|
| A | 10 | Latex | 26 | — | DMAEA.MCQ/AcAm |
| B | 10 | Latex | 26 | Sodium hypophosphite | DMAEA.MCQ/AcAm |
| C | 10 | Latex | 18 | VTMS | DMAEA.MCQ/AcAm |
| D | 10 | Latex | 31 | MBA | DMAEA.MCQ/AcAm |
| E | 10 | Latex | 31 | Sodium formate | DMAEA.MCQ/AcAm |
| F | 10 | Latex | 23 | MBA/Sodium formate | DMAEA.MCQ/AcAm |
| G | 50 | Latex | 8.8 | MBA/Sodium formate | DMAEA.MCQ/AcAm |
| H | 17 | Latex | 22 | — | DMAEA.MCQ/AcAm |
| I | 20 | Latex | 22 | — | DMAEA.MCQ/AcAm |
| J | 30 | Dispersion | 5 | — | DADMAC/AcAm |
| K | 30 | Latex | 4.9 | — | DADMAC/AcAm |
| L | 30 | Latex | 2 | — | DADMAC/AcAm |
| M | 50 | Latex | 5.3 | — | DADMAC/AcAm |
| N | 30 | Latex | 7.3 | — | DADMAC/AcAm |
| O | 100 | Solution | — | | DADMAC |
| P | 100 | Solution | — | | EPI/DMA x-linked |
| Q | 100 | Solution | — | | EPI/DMA linear |
| alum | | Solution | — | | 50 wt % $Al_2(SO_4)_3$ * 14.3$H_2O$ |

EXAMPLE 3

Table 3 shows the results of retention testing on a papermaking furnish treated with a conventional (Polymer A, H or I) or structurally modified (Polymer B) polymer in the presence and absence of a DADMAC/AcAm copolymer (Polymer K). Retention performance is measured using a dynamic drainage jar (DDJ) as described in Britt, K. W., *TAPPI J.*, vol. 56 (10), p 46 (1973); and Britt, K. W. and Unbehend, J. E., *TAPPI J.*, vol. 59(2), p 67 (1976) using TAPPI Test Method T 261 cm-94. Increased retention of fines and fillers is indicated by a decrease in the turbidity of the DDJ filtrate.

The furnish has a consistency of 0.84% and contains 88% TMP with 12% kaolin clay added for opacity.

A 125P (76 μm) screen is used throughout the testing and the shear rate is kept constant at 1000 rpm. Table 2 shows the timing sequence for DDJ testing.

TABLE 2

Timing sequence used in DDJ retention measurements.

| Time (s) | Action |
|---|---|
| 0 | Start mixer and add sample furnish |
| 10 | Add coagulant or DADMAC/AcAm copolymer if desired |
| 20 | Add flocculant if desired |
| 30 | Open drain valve and start collecting the filtrate |
| 60 | Stop collecting the filtrate |

TABLE 3

Comparison of retention performance of Polymer A, B, H, and I used alone or with DADMAC/AcAm Copolymer.

| DADMAC/AcAm Copolymer | | Flocculant | | Filtrate |
|---|---|---|---|---|
| Name | Dose (kg/t as actives) | Name | Dose (kg/t as actives) | Turbidity (NTU) |
| — | — | Polymer A | 0.26 | 550 |
| — | — | Polymer B | 0.35 | 325 |
| — | — | Polymer H | 0.37 | 417 |
| — | — | Polymer I | 0.35 | 342 |
| Polymer K | 0.35 | Polymer A | 0.26 | 468 |
| Polymer K | 0.35 | Polymer B | 0.35 | 223 |
| Polymer K | 0.35 | Polymer H | 0.37 | 301 |
| Polymer K | 0.35 | Polymer I | 0.35 | 237 |

As shown in Table 3, the lowest filtrate turbidity is obtained using the treatment of the present invention (0.35 kg/t Polymer K followed by 0.35 kg/t Polymer B). This polymer combination provides improved performance over the single cationic polymer treatments using Polymers A, H, and I and over the dual treatment programs of 0.35 kg/t Polymer K followed by each of the Polymers A, H, and I.

EXAMPLE 4

In this example, the furnish of Example 3 is treated with a conventional coagulant (Polymer O, P or Q) or DADMAC/AcAm copolymer (Polymer J, K, L, M or N) and then a structurally modified cationic polymer. The retention performance of the furnish, as reflected by the filtrate turbidity, is shown in Table 4.

TABLE 4

Retention performance of typical coagulants and DADMAC/AcAm copolymers in combination with a representative structurally modified polymer.

| Coagulant or Copolymer | | Flocculant | | Filtrate |
|---|---|---|---|---|
| Name | Dose (kg/t as actives) | Name | Dose (kg/t as actives) | Turbidity (NTU) |
| Polymer O | 0.37 | Polymer B | 0.35 | 290 |
| Polymer P | 0.45 | Polymer B | 0.35 | 298 |
| Polymer Q | 0.52 | Polymer B | 0.35 | 313 |
| Polymer J | 0.2 | Polymer B | 0.35 | 257 |
| Polymer K | 0.35 | Polymer B | 0.35 | 223 |
| Polymer L | 0.4 | Polymer B | 0.35 | 268 |
| Polymer M | 0.4 | Polymer B | 0.35 | 259 |
| Polymer N | 0.31 | Polymer B | 0.35 | 218 |

As shown in Table 4, a structurally modified polymer in combination with DADMAC/AcAm copolymer (Polymers J, K, L, M or N) provides improved retention, as indicated by lower filtrate turbidities, compared to the combination with typical coagulants (Polymers O, P, or Q).

EXAMPLE 5

This example shows the first pass ash retention (FPAR) for the furnish of Example 3 treated with a conventional flocculent (Polymer I) or a representative structurally modified polymer (Polymer B) in combination with a DADMAC/AcAm copolymer (Polymer K).

The retention testing is conducted using a Dynamic Drainage Jar (DDJ) according to the procedure described in TAPPI Test Method T 261 cm-94, except that ash retention is measured instead of fines retention. Ash retention is defined as the fraction of the total mineral fillers in the furnish that does not pass the 125P screen (76 μm openings) in the DDJ. This provides an indication of the amount of filler that remains with the paper web during papermaking.

The ash content of the furnish is determined gravimetrically after oxidizing the sample for 30 minutes at 550° C. in a microwave oven. This causes the cellulose fibers and other wood components to convert to carbon dioxide, so that only the mineral fillers like clay remain.

TABLE 5

First Pass Ash Retention (FPAR) for the combination of DADMAC/AcAm copolymer with a conventional and structurally modified polymer.

| DADMAC/AcAm Copolymer | | Flocculant | | |
|---|---|---|---|---|
| Name | Dose (kg/t as actives) | Name | Dose (kg/t as actives) | FPAR (%) |
| — | — | — | — | 15.2 |
| Polymer K | 0.35 | Polymer B | 0.175 | 69.0 |
| Polymer K | 0.35 | Polymer B | 0.7 | 92.8 |
| Polymer K | 0.35 | Polymer I | 0.175 | 58.9 |
| Polymer K | 0.35 | Polymer I | 0.35 | 68.2 |
| Polymer K | 0.35 | Polymer I | 0.7 | 84.8 |

As shown in Table 5, the structurally-modified polymer (Polymer B) provides significantly improved ash retention compared to the typical flocculent (Polymer I), when used in conjunction with 0.35 kg/t of a DADMAC/AcAm copolymer (Polymer K).

EXAMPLE 6

This example shows the results of Vacuum Drainage Tester (VDT) measurements on the furnish of Example 3 treated with a conventional flocculant (Polymer A) or a representative structurally modified polymer (Polymer B) in combination with a DADMAC/AcAm copolymer (Polymer K).

During VDT testing, the furnish is drained through an Ahlstrom 1278 filter paper (available from Ahlstrom Filtration, Inc, Mount Holly Springs, Pa.) under applied vacuum to form a pad. The time required to drain 200 ml of filtrate and the time required for removal of a continuous water phase from the pad (vacuum break time) is recorded. The vacuum pump is operated for one minute after the vacuum break and the vacuum value, referred to as the final pad vacuum, is recorded. The pad is removed from the VDT instrument, weighed, and dried in an oven at 105° C. The weight of the dry pad is used to determine the pad consistency.

The vacuum break time is a measure of the rate of water removal from the pulp in the forming section of the paper machine. If a polymer treatment increases the rate of water removal, it may be possible to add water to the headbox to reduce consistency, resulting in formation improvements, and improved vacuum and press dewatering. The final pad vacuum is inversely proportional to the air permeability of the pad. Increased permeability usually results from increased flocculation of the pulp and poor sheet formation. Good formation gives greater resistance to air channeling, resulting in a higher final pad vacuum. The pad consistency is a measure of the total extent of water removal. This is analogous to measuring solids or dryness at the papermachine couch roll. Higher pad consistencies will correlate to increased press dewatering and improved dryer section efficiency, resulting in increased production capacity.

Drainage is evaluated with the VDT using the mixing conditions and polymer addition sequence summarized in Table 6. The results are summarized in Table 7.

TABLE 6

Procedure for the evaluation of drainage with the Vacuum Drainage Tester (VDT).

| Time (s) | Action |
|---|---|
| 0 | Turn on stirrer at 1000 rpm and add alum if desired |
| 10 | Add either typical coagulant or DADMAC/AcAm copolymer |
| 20 | Add flocculant |
| 30 | Drain furnish |
| 1 minute after vacuum break | Measure final vacuum, stop |

TABLE 7

Drainage Data for the combination of 0.35 kg/t of a DADMAC/AcAm Copolymer and a Representative Structurally Modified Polymer or a Conventional Flocculant

| DADMAC/AcAm Copolymer | | Flocculant | | Pad |
|---|---|---|---|---|
| Name | Dose (kg/t as actives) | Name | Dose (kg/t as actives) | Time to 200 ml (s) | Consistency (%) |
| — | — | — | — | 26.1 | 26.1 |
| Polymer K | 0.35 | Polymer A | 0.26 | 22.1 | 24.8 |
| Polymer K | 0.35 | Polymer B | 0.175 | 16.5 | 25.2 |
| Polymer K | 0.35 | Polymer B | 0.35 | 14.5 | 24.1 |

As shown in Table 7, the structurally-modified 10 mol % cationic Polymer B provides significantly improved furnish drainage, as indicated by a reduced time to drain 200 ml, compared to the typical 10 mol % cationic Polymer A, when used in conjunction with 0.35 kg/t of a DADMAC/AcAm copolymer (Polymer K). The combination of 0.35 kg/t Polymer K followed by 0.175 kg/t Polymer B provides faster drainage and higher pad consistency compared to 0.35 kg/t Polymer K followed by 0.26 kg/t Polymer A. This suggests that the present invention provides improved gravity drainage with the possibility for improved pressing and drying compared to the prior known art.

EXAMPLE 7

This example shows drainage testing results for a papermaking furnish treated with combinations of alum, a representative DADMAC/AcAm copolymer (Polymer M), a conventional polymer coagulant (Polymer P) and a representative structurally modified polymer (Polymer B).

The furnish used is 0.95% consistency newsprint furnish containing 70% deinked pulp and 30% TMP with 12 kg/t of precipitated calcium carbonate added for brightness and opacity. The thin stock has a pH of 7.1. Drainage is evaluated with the VDT using the mixing conditions and polymer addition sequence summarized in Table 6. Each test has 4.2 kg/t alum added at time zero. The results are reported in Table 8 as vacuum break time, which is inversely related to the furnish drainage rate.

TABLE 8

Drainage data using Polymers B, M, P, and combinations of Polymers M and P with Polymer B.

| Coagulant or DADMAC/AcAm Copolymer | | Flocculant | | Vacuum Break Time (s) |
|---|---|---|---|---|
| Name | Dose (kg/t as actives) | Name | Dose (kg/t as actives) | |
| Polymer P | 0.77 | | | 126 |
| | | Polymer B | 0.29 | 78 |
| Polymer P | 0.77 | Polymer B | 0.29 | 64 |
| Polymer M | 0.68 | | | 79 |
| Polymer M | 0.68 | Polymer B | 0.29 | 39 |

The vacuum break times shown in Table 8 indicate that the dual polymer treatment of the present invention (0.68 kg/t Polymer M followed by 0.29 kg/t Polymer B) results in faster furnish drainage than Polymer M, Polymer P, or Polymer B alone. Also, the present invention provides faster drainage than the dual polymer treatment of the typical coagulant, Polymer P, followed by the structurally-modified Polymer B.

EXAMPLE 8

This example shows drainage testing results for a papermaking furnish treated with a combination of a representative DADMAC/AcAm copolymer (Polymers J or M), and a representative structurally modified polymer (Polymer B).

The furnish used has a consistency of 0.82% and contains 58% deinked pulp, 9% TMP, 7% machine broke, and 26% filler. The filler is a 55/45 weight percent mixture of precipitated calcium carbonate and kaolin clay. The thin stock contains 4 kg/t alum and has a pH of 7.5. Drainage is evaluated with the VDT using the mixing conditions and polymer addition sequence summarized in Table 6. The results are reported in Table 9 as vacuum break time, which is inversely related to the furnish drainage rate.

TABLE 9

Drainage data using Polymers B, J, M, and combinations of Polymers M and J with Polymer B

| DADMAC/AcAm Copolymer | | Flocculant | | Vacuum Break Time (s) |
|---|---|---|---|---|
| Name | Dose (kg/t as actives) | Name | Dose (kg/t as actives) | |
| | | Polymer B | 0.18 | 64 |
| Polymer M | 0.40 | | | 66 |
| Polymer J | 0.40 | | | 51 |
| Polymer M | 0.40 | Polymer B | 0.18 | 30 |
| Polymer J | 0.40 | Polymer B | 0.18 | 31 |
| Polymer M | 0.80 | Polymer B | 0.18 | 23 |
| Polymer J | 0.80 | Polymer B | 0.18 | 25 |
| Polymer M | 0.40 | Polymer B | 0.35 | 21 |
| Polymer J | 0.40 | Polymer B | 0.35 | 20 |

The vacuum break times shown in Table 9 indicate that the dual polymer treatments of the present invention (either DADMAC/AcAm copolymer J or M prior to the structurally-modified Polymer B) result in faster furnish drainage rates than any of the individual polymers used as a single polymer treatment.

EXAMPLE 9

This example shows the first pass ash retention (FPAR) for the furnish of Example 7 treated with a conventional flocculent (Polymer H) or a representative structurally modified polymer (Polymer B) in combination with a DADMAC/AcAm copolymer (Polymer M). The FPAR is measured using the procedure described in Example 5 and the DDJ timing sequence shown in Table 2. The results are shown in Table 10.

TABLE 10

Retention data for furnish from Example 7 aided by a conventional flocculant or a structurally modified polymer alone and in combination with a DADMAC/AcAm copolymer.

| DADMAC/AcAm Copolymer | | Flocculant | | |
|---|---|---|---|---|
| Name | Dose (kg/t as actives) | Name | Dose (kg/t as actives) | FPAR (%) |
| — | — | Polymer B | 0.36 | 33.9 |
| — | — | Polymer H | 0.36 | 30.4 |
| Polymer M | 0.7 | Polymer B | 0.36 | 54.2 |
| Polymer M | 0.7 | Polymer H | 0.36 | 43.7 |

As shown in Table 10, the structurally-modified 10 mol % cationic Polymer B provides better ash retention than the typical 17 mol % cationic Polymer H. This difference in performance is magnified when 0.7 kg/t DADMAC/AcAm copolymer M is used prior to either Polymer B or Polymer H as a dual treatment program.

EXAMPLE 10

This example shows the first pass ash retention (FPAR) for the furnish of Example 8 treated with a representative structurally modified polymer (Polymer B) in combination with a DADMAC/AcAm copolymer (Polymer J or M). The FPAR is measured using the procedure described in Example 5 and the DDJ timing sequence shown in Table 2. The results are shown in Table 11.

TABLE 11

Retention data for the furnish of Example 8 aided by a structurally modified polymer alone and in combination with DADMAC/AcAm copolymers.

| DADMAC/AcAm Copolymer | | Flocculant | | |
|---|---|---|---|---|
| Name | Dose (kg/t as actives) | Name | Dose (kg/t as actives) | FPAR (%) |
| — | — | Polymer B | 0.18 | 62.2 |
| — | — | Polymer B | 0.35 | 76.4 |
| Polymer J | 0.4 | Polymer B | 0.18 | 89.7 |
| Polymer M | 0.4 | Polymer B | 0.18 | 85.1 |
| Polymer J | 0.4 | Polymer B | 0.35 | 97.2 |
| Polymer M | 0.4 | Polymer B | 0.35 | 96.1 |

As shown in Table 11, ash retention is significantly improved when the dual component treatment of the present invention (Polymer J or Polymer M prior to Polymer B) is used compared to the single polymer treatment of Polymer B alone. Also, the same improvement in retention provided by use of the dual component treatment of the present invention could not be obtained by increasing the dose of Polymer B from 0.18 to 0.35 kg/t as a single component treatment.

EXAMPLE 11

This example shows the flocculation response, measured as the peak change in mean chord length for the papermaking furnish of Example 8 treated with a structurally modified polymer (Polymer B) alone and in combination with a DADMAC/AcAm copolymer (Polymer M or P). The results are shown in Table 13.

Flocculation activity is measured by focused beam reflectance measurement (FBRM) using the Lasentec™ M500 (Lasentec, Redmond, Wash.). This is a scanning laser microscopy (SLM) device that is used to measure the size distribution of solids in the furnish versus time during coagulation and flocculation. The technique is described in detail in Alfano et al, *Nordic Pulp Paper Res. J,* vol. 13(2), p 59 (1998) and U.S. Pat. No. 4,871,251.

The number average chord length or mean chord length (MCL) as a function of time is used to characterize the flocculation response. The peak change in MCL caused by addition of the polymer treatments is used to compare their effectiveness. The peak change in MCL gives a representation of the speed and extent of flocculation under the shear conditions present.

The timing sequence used in the FBRM testing is shown in Table 12.

TABLE 12

Timing sequence used in the Lasentec ™ M500 FBRM testing.

| Time (s) | Action |
|---|---|
| 0 | Start mixer |
| 18 | Add coagulant or DADMAC/AcAm copolymer when desired |
| 26 | Add flocculant when desired |
| 110 | Stop experiment |

TABLE 13

Flocculation response for furnish from Example 8 treated with a conventional coagulant or DADMAC/AcAm copolymer in combination with a structurally modified polymer.

| Coagulant or DADMAC/AcAm Copolymer | | Flocculant | | Peak Change in MCL (μm) |
|---|---|---|---|---|
| Name | Dose (kg/t as actives) | Name | Dose (kg/t as actives) | |
| — | — | Polymer B | 0.29 | 3.3 |
| Polymer M | 0.4 | Polymer B | 0.29 | 6.6 |
| Polymer P | 0.8 | Polymer B | 0.29 | 5.0 |
| Polymer M | 0.8 | Polymer B | 0.29 | 9.1 |
| Polymer P | 1.9 | Polymer B | 0.29 | 10.3 |

As shown in Table 13, flocculation response is greatly improved using a dual component treatment with structurally-modified Polymer B compared to the use of Polymer B alone. Also, use of the DADMAC/AcAm copolymer (Polymer M) prior to Polymer B provides a significantly better flocculation response compared to the use of the typical coagulant (Polymer P) prior to Polymer B.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

We claim:

1. A method of increasing retention and drainage in a papermaking furnish comprising adding to the furnish an effective amount of a diallyl-N,N-disubstituted ammonium halide/acrylamide copolymer and an effective amount of a cationic structurally-modified water soluble polymer, wherein the cationic structurally-modified water-soluble polymer prepared by initiating polymerization of an aqueous solution of from about 95 to about 5 mole percent of an acrylamide monomer of formula

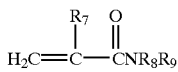

wherein $R_7$, $R_8$ and $R_9$ are independently selected from H and alkyl and from about 5 to about 95 mole percent of a cationic monomer of formula

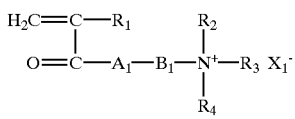

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alkyl; $R_3$ is H, $C_1$–$C_2$ alkyl or arylalkyl; and $X_1$ is an anionic counterion under free radical polymerization conditions to form a polymer solution and adding at least one structural modifier to the polymer solution after at least 30% polymerization of the monomers has occurred.

2. The method of claim 1 wherein the structural modifier is selected from the group consisting of cross-linking agents, chain transfer agents and mixtures thereof.

3. The method of claim 1 wherein the cationic monomer is dimethylaminoethyl acrylate methyl chloride quaternary salt and the acrylamide monomer is acrylamide.

4. The method of claim 3 wherein the structural modifier is selected from the group consisting of sodium formate, sodium hypophosphite, vinyltrimethoxysilane, methylenebisacrylamide, and combinations thereof.

5. The method of claim 4 wherein the structurally modified polymer is dimethylaminoethyl acrylate methyl chloride quaternary salt/acrylamide copolymer.

6. The method of claim 5 wherein the dimethylaminoethyl acrylate methyl chloride quaternary salt/acrylamide copolymer is composed of from about 5 to about 30 mole percent dimethylaminoethyl acrylate methyl chloride quaternary salt and from about 95 to about 70 mole percent acrylamide.

7. The method of claim 1 wherein the diallyl-N,N-disubstituted ammonium halide/acrylamide copolymer is diallyldimethylammonium chloride/acrylamide.

8. The method of claim 7 wherein the diallyldimethylammonium chloride/acrylamide copolymer is composed of from about 25 to about 55 mole percent diallyldimethylammonium chloride and from about 75 to about 45 mole percent acrylamide.

9. The method of claim 1 wherein the diallyl-N,N-disubstituted ammonium halide/acrylamide copolymer has a RSV of from about 1 to about 10 dl/g and the cationic structurally-modified water soluble polymer has a RSV of from about 12 to about 40 dl/g.

10. The method of claim 1 further comprising adding a microparticle to the furnish.

* * * * *